Sept. 15, 1936.   C. W. BETTCHER ET AL   2,054,592
FEED PUSHER
Filed Oct. 16, 1934   2 Sheets—Sheet 2
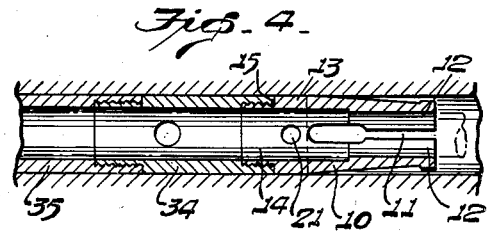
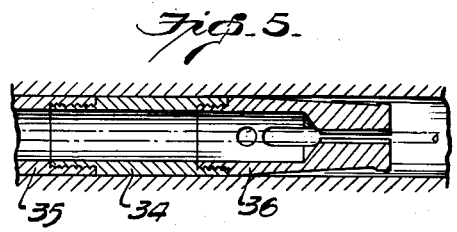
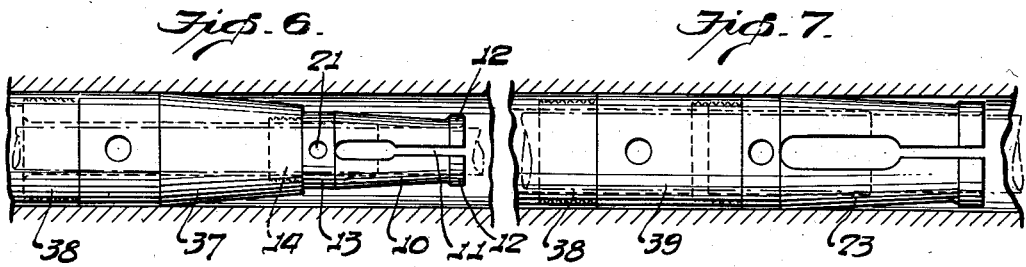
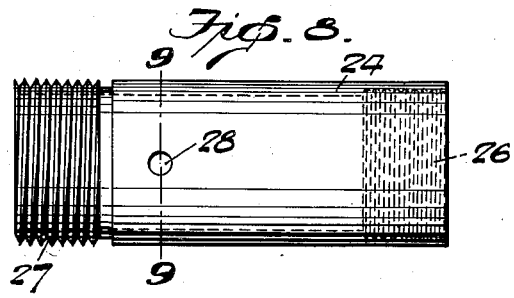
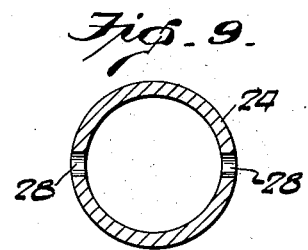
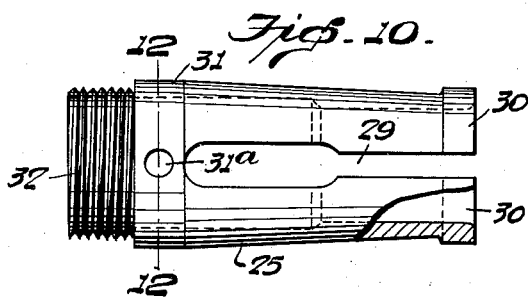
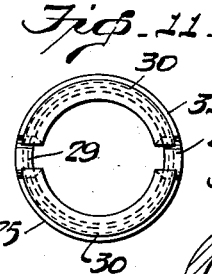
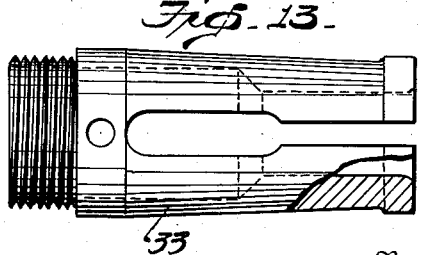
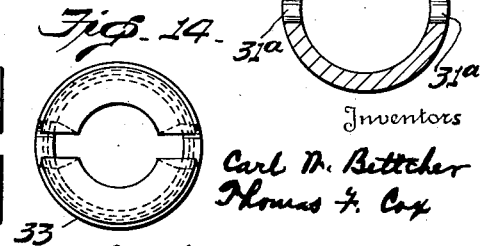
Inventors
Carl W. Bettcher
Thomas F. Cox
By Ritter, Mechlin & O'Neill
Their Attorneys Patented Sept. 15, 1936

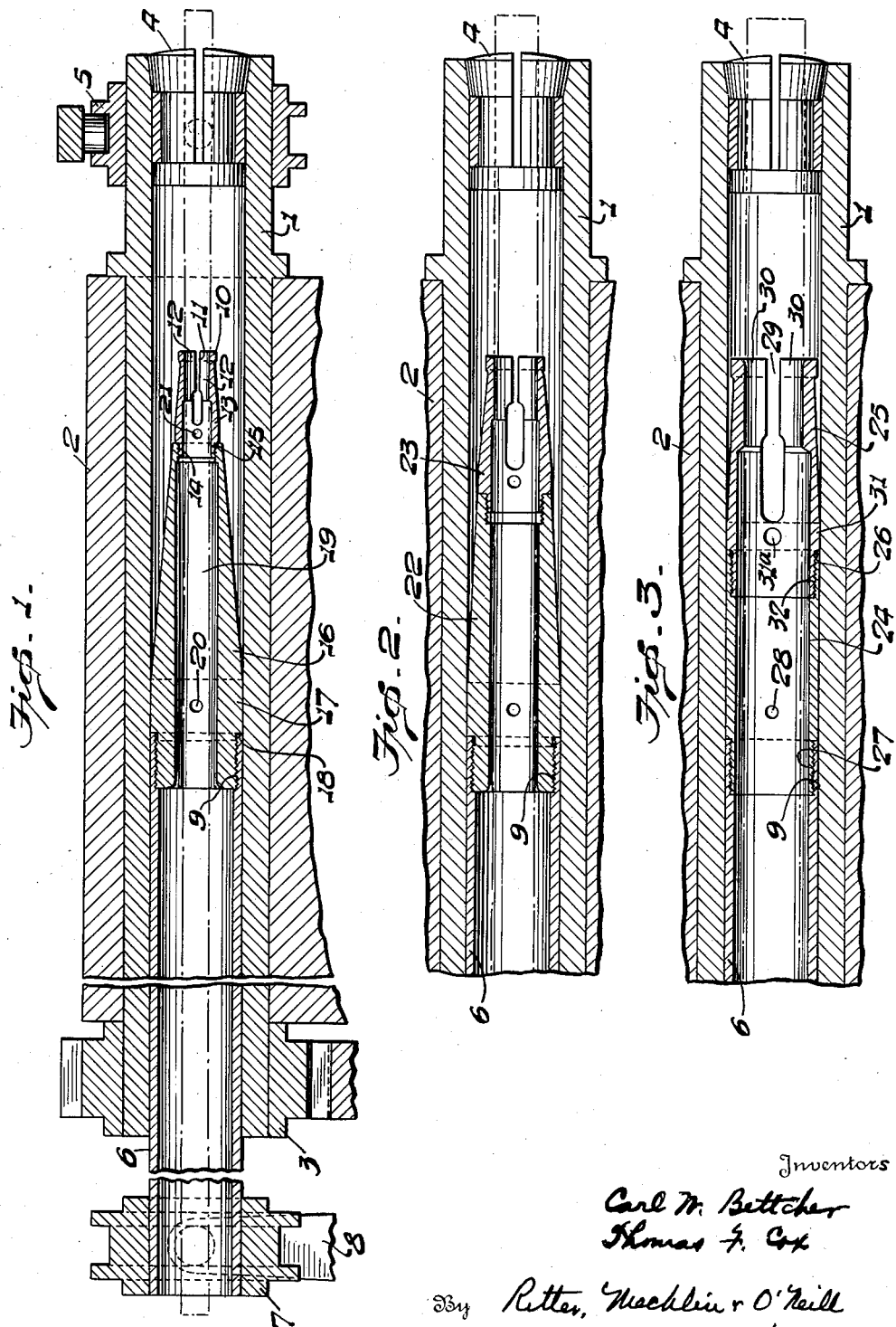

2,054,592

UNITED STATES PATENT OFFICE 2,054,592

FEED PUSHER

Carl W. Bettcher and Thomas F. Cox, New Haven, Conn., assignors to The Eastern Machine Screw Corporation, New Haven, Conn., a corporation of Connecticut Application October 16, 1934, Serial No. 748,559

8 Claims. (Cl. 29—62)

Our invention relates to automatic screw machines and more particularly to the stock or work feeding mechanism of those machines which include a reciprocating feed tube.

As is well known, automatic screw machines have different capacities; that is, each machine is capable of only receiving stock falling within a definite diameter range. Some machines are of small or limited capacity, while others are of comparatively large capacity and the range of a small capacity machine may be comprehended within the range of a large capacity machine. For example, the capacity of a machine for feeding stock of $\frac{1}{16}''-\frac{3}{8}''$ in diameter will be comprehended within the capacity of a machine for feeding stock of $\frac{1}{16}''-\frac{5}{8}''$ diameter and the capacity of each of these machines will be included within the capacity of a machine for feeding stock of $\frac{1}{16}''-\frac{7}{8}''$ diameter. The stock feeding mechanism of these machines works in timed relation with a chuck or collet, which holds the stock during the cutting operation, and it comprises a stock gripping member (termed a "feed pusher") which, when the stock is held by the collet, moves rearwardly with respect to the work, but, when the collet is released, moves forwardly, carrying the stock with it.

While many different forms of feed pushers have been devised, the one having a plurality of spring fingers is perhaps most extensively used. Such feed pushers have not, however, been entirely satisfactory. One factor contributing to this is that, to prevent wastage of stock, all feed pushers for any one machine, irrespective of its capacity, must be the same length. Since the larger the stock is the longer the pusher will have to be for its fingers to have the necessary spring action, the length of all the pushers for a particular machine is determined by the length which will be most effective for the pusher adapted to feed stock of the greatest diameter and weight the machine will receive. Accordingly the feed pushers of a machine of large capacity will be relatively long and those for feeding the smaller sizes of stock the machine is adapted to receive will be materially longer than necessary. For example, in a machine of $\frac{1}{16}''-\frac{7}{8}''$ capacity, the feed pusher for $\frac{1}{16}''$ stock would be considerably too long if made as long as the pusher for efficiently feeding $\frac{7}{8}''$ stock, which it must be to prevent the end of the $\frac{1}{16}''$ stock from being wasted.

With the possible exception, therefore, of the feed pusher for feeding stock of maximum size, it is not possible to employ feed pushers of the spring finger type for feeding stock of other sizes within the capacity of a machine which are properly designed with regard to the particular size and weight of stock they are intended to feed. Spring finger feed pushers which are not thus properly designed fail to exert the desired spring action on the stock, either not gripping sufficiently tight to feed the stock properly or gripping so tight as to score the stock. Moreover, feed fingers which are not designed with particular regard to the size and weight of the stock they are intended to feed will not last as long as those which have been designed with reference to the particular work to be performed thereby. In addition to failing to function as efficiently and to last as long as properly designed feed pushers, substantially all those now in use, being longer and in some cases considerably longer than necessary, are formed of more metal than would otherwise be required. Properly designed feed pushers would, therefore, be less expensive from the standpoint of initial cost alone.

Feed pushers of the spring finger type are not satisfactory from another view-point and that is; those for feeding stock in a machine of one capacity cannot be used for feeding the same size stock in a machine of different capacity. This is due to the fact that, in machines of different capacity, the feed tubes are of different size and the feed pushers are of different length. If feed pushers designed for use in large capacity machines were used in machines of small capacity, they would foul the work holding collet, and if feed pushers designed for use in small capacity machines were used in machines of large capacity, they would not push out the rear end of the stock and this would result in considerable wastage. As feed pushers for the same size stock cannot be used in machines of different capacity, each machine must, therefore, have a complete stock of feed pushers, thus making it necessary for the average jobber, who, as is well known, is usually provided with a number of machines, the capacity of which partly or entirely overlap, to keep on hand a number of different feed pushers for feeding stock of the same weight and size.

It is the principal object of the present invention to provide means enabling the use, with automatic screw machines, of feed pushers of the spring finger type which, having regard for the diameter and weight of stock they are intended to feed, are designed to function most efficiently. Another object of the invention is to provide means permitting feed pushers of the spring finger type to be used interchangeably in automatic screw machines of different capacities.

A primary feature of the invention consists in providing an automatic screw machine, adapted to receive spring finger feed pushers for feeding different size stock, with a plurality of members of different lengths for selectively connecting the pushers to the feed tube, the over-all length of each member and the feed pusher cooperable therewith being the same.

Another feature of the invention consists in providing a plurality of members of different length for selectively receiving a spring finger feed pusher, whereby the latter may be selectively associated with the feed tubes of automatic screw machines of different capacities.

Other and more specific features of the invention, residing in advantageous forms, combinations and relations of parts, will hereinafter appear and be pointed out in the claims. In the drawings:

Figure 1 is a longitudinal sectional view of parts of the feeding mechanism of an automatic screw machine of $\frac{1}{16}''-\frac{7}{8}''$ capacity with which is associated a feed pusher for feeding stock of relatively small diameter.

Figure 2 is a view similar to Figure 1 showing the feeding mechanism equipped with a feed pusher for feeding stock of slightly larger diameter.

Figure 3 is another view similar to Figure 1 showing the feeding mechanism equipped with a feed pusher for feeding work of still larger diameter.

Figure 4 is a fragmentary sectional view showing the feed pusher illustrated in Figure 1 associated with the feeding mechanism of a machine of $\frac{1}{16}''-\frac{3}{8}''$ capacity.

Figure 5 is a fragmentary sectional view showing a machine of the capacity illustrated in Figure 4 equipped with a feed pusher for feeding stock of smaller diameter.

Figure 6 is a fragmentary view partly in section and partly in elevation showing the feed pusher illustrated in Figure 2 applied to a machine of $\frac{1}{16}''-\frac{5}{8}''$ capacity.

Figure 7 is a view similar to Figure 6 showing a machine of the same capacity equipped with a feed pusher for feeding stock of larger diameter.

Figure 8 is a side elevation of the member illustrated in Figure 3 for connecting the feed pusher to the feed tube.

Figure 9 is a sectional view taken on line 9—9 of Figure 8.

Figure 10 is an enlarged side elevation of the feed pusher illustrated in Figure 3.

Figure 11 is an end view of the feed pusher illustrated in Figure 10.

Figure 12 is a sectional view taken on line 12—12 of Figure 10.

Figure 13 is a side elevation of another feed pusher which is adapted to be received by the member illustrated in Figure 8 for feeding stock of smaller diameter than the feed pusher shown in Figure 10.

Figure 14 is an end view of the feed pusher illustrated in Figure 13.

For purposes of illustrating the invention, feeding mechanisms of machines of three different capacities have been shown and, except for size, the mechanism of each machine is identical. Moreover, the general features of the feeding mechanism illustrated are merely exemplary of various ones which are now on the market and it will be appreciated as the specification proceeds that the invention is not limited in its application to any particular make or capacity of machine, but is capable of being used in conjunction with all types and with all capacities of automatic screw machines which include a reciprocating feed tube.

As is well known, machines of this type include a rotatable spindle 1, which is journaled within a suitable head or bearing 2. At its rear end, the spindle is provided with a driving gear 3 and, at its forward end, it is interiorly provided with a chuck or collet 4, which is operated by any suitable mechanism such as illustrated at 5. Mounted within the rotatable spindle is a feed tube 6 which is provided at its rear end with a collar 7 or the like, through which reciprocatory motion is transmitted thereto by means of mechanism, partly shown at 8. This mechanism works in timed relation with the collet 4, moving the feed tube forwardly, when the collet is released, and rearwardly, when the collet is holding the work. These features of construction and operation of the feeding mechanism are common to most types of automatic screw machines and form no part of the present invention.

The forward end of the feed tube 6 is customarily formed on its interior with screw threads, as at 9, for the purpose of receiving exteriorly threaded rear portions of the feed pushers adapted to be associated therewith. As has been previously pointed out, the feed pushers for any one machine must all be of the same length to prevent wastage of stock and this length is dictated by the maximum size stock the particular machine is intended to receive. Elimination of the necessity of having all feed pushers of a machine the same length would permit the use of feed pushers of the spring finger type which are designed with particular reference to the specific diameter and weight of stock they are designed to feed. This would not only enable the use of feed fingers which would function most efficiently for each size stock within the capacity of a machine, but it would permit most feed pushers to be made of a superior grade spring steel without increased cost on account of the reduced amount of metal required in correctly designed pushers.

This would be especially true of the feed pushers of large capacity machines for feeding the smaller sizes of stock.

These desirable results are obtained in the present invention by providing each machine with a plurality of adapter members which are adapted to be selectively connected with the forward end of the feed tube for connecting the feed pushers thereto. The number of adapter members required for each machine will depend upon the capacity thereof, that is, the larger the capacity of the machine, the greater the number of adapters. Each adapter of a machine is of different length and its length is directly proportional to the length of the pushers it is intended to receive, so that the over-all length of each combined adapter and pusher in any one machine will be the same. While one adapter could be provided for each feed pusher, this has been found unnecessary, because the variation is small in the ideal lengths of feed pushers for stock within a narrow diameter range, such, for instance, as $\frac{13}{32}''$ to $\frac{5}{8}''$. Feed pushers for limited diameter ranges of stock can, therefore, be made the same length without materially affecting their efficiencies, and one adapter can serve for each pusher within the limited range.

In Figure 1, illustrating a machine of $\frac{1}{16}''-\frac{7}{8}''$ capacity, a feed pusher of the spring finger type for feeding 3/8" diameter stock is shown. This feed finger has been designed with particular regard for the size stock it is to feed and its forward end is slotted, as at 11, to provide a plurality of spring fingers 12. At their inner ends, the fingers merge into a cylindrical body portion 13 and projecting rearwardly from the latter is an exteriorly threaded portion 14 which is of reduced diameter and thus forms with the portion 13 a shoulder 15. The threaded portion 14 cooperates with threads formed on the interior of an adapter member 16 and the shoulder 15 is adapted to abut against the end of the adapter.

The adapter 16 has an intermediate cylindrical portion 17, the outside diameter of which is substantially equal to the inside diameter of the spindle 1. To the rear of the cylindrical portion 17, the adapter is of reduced diameter to provide a shoulder 18 for engagement with the forward end of the feed tube and this reduced portion is exteriorly threaded to cooperate with the threads 9 of the feed tube. The adapter is provided with a longitudinal bore 19 of a diameter sufficiently larger than that of the maximum size of stock to be fed by the pushers cooperable therewith, so that in its rearward travel the adapter will readily move relatively to the stock. The weight of the adapter may be advantageously reduced by progressively decreasing the outside diameter thereof from the cylindrical portion 17 to adjacent its forward end. The adapter is preferably provided with openings 20 to receive a spanner wrench (not shown) for rigidly connecting the adapter to the feed tube and the feed pusher is likewise formed with openings 21, whereby it may be rigidly connected to the adapter by a spanner wrench.

In addition to receiving a feed pusher for 3/8" stock, adapter 16 may also receive feed pushers for stock of 1/16" to 11/32", inclusive, in diameter, because the dimensions of the most efficient feed pushers for stock within this limited range, namely 1/16" to 3/8", do not vary materially. The feed pushers for this range of stock may, therefore, be made of the same length and each will be provided with an exteriorly threaded portion identical with the portion 14, so that it may be used with the adapter 16. Except for the bore of the spring fingers, each of the adapters within this limited range may be identical in construction.

Figure 2, which illustrates a machine of the same capacity as that of Figure 1, shows an adapter 22 for receiving feed pushers for stock of 13/32" to 5/8", inclusive. The feed pusher 23 associated with the adapter has been designed for feeding 5/8" stock. Adapter 22 is substantially identical with adapter 16, differing therefrom only in length and size of bore. Moreover, feed pusher 23 of Figure 2 is identical with feed pusher 10 of Figure 1, except for size.

Figure 3, also illustrating a machine of 1/16"-7/8" capacity, shows an adapter 24 for receiving feed pushers for stock of 21/32" to 7/8" in diameter, the feed pusher 25 shown therein being the one particularly designed for feeding 7/8" stock. Adapter 24, shown in detail in Figures 8 and 9, is preferably formed as a cylindrical tube and thus differs somewhat in shape from adapters 16 and 22. It has, however, the same structural features as those adapters, being provided at its forward end with an interiorly threaded portion 26 to receive the feed pushers and having at its rear end a reduced portion 27 which is exteriorly threaded for connection to the forward end of the feed tube. Moreover, like the other adapters, adapter 24 is formed with openings 28 for receiving a spanner wrench or other suitable tool.

Feed pusher 25, shown in detail in Figures 10 to 12, inclusive, has the same structural features as the other illustrated pushers, differing therefrom only in size. Thus, it is provided with slots 29 defining the spring fingers 30, with an intermediate cylindrical portion 31 and a rearwardly extending exteriorly threaded portion 32 of reduced diameter for connection with the forward end of adapter 24. It is also formed with suitable openings 31a for receiving a spanner wrench.

Figures 13 and 14 illustrate another feed pusher 33 which may be associated with the adapter 24. This feed pusher is for stock of 21/32" and, like all other pushers for stock with the range of 21/32"-7/8", it is identical in all respects with feed pusher 25 except for the diameter of bore. The only difference, therefore, between the feed pushers for stock within limited diameter ranges is in the thickness of the forward portions of the spring fingers.

Upon comparing Figures 1 to 3, inclusive, it will be observed that, while each of the feed pushers illustrated are of different length, the overall length of each feed pusher and its associated adapter is the same. This is accomplished by reducing the adapters in length as the feed pushers increase in length. Thus, it will be perceived that, irrespective of the capacity of a machine, each feed pusher for use therein may be made of the most efficient length for the diameter and weight of stock it is intended to feed without wasting any stock. This not only enables the use of feed fingers which will function most efficiently, but, since each is only made of sufficient metal to give it the desired characteristics, the feed pushers may be made of a superior grade of spring steel without an increase in cost.

As the feed pushers are designed with particular reference to the size of stock they are intended to feed and no account is taken of the capacity of the machine in which they are to be used, they may, therefore, be interchangeably used in machines of different capacity by employing suitable adapter members. Thus, the feed pusher 10 illustrated in Figure 1, which is for stock of 3/8", may be used in any machine capable of receiving stock that size. For example, feed pusher 10 may be used in a machine of 1/16"-3/8" capacity, as shown in Figure 4, and also in a machine of 1/16"-5/8" capacity, as shown in Figure 6.

To enable feed pusher 10 to be used in a machine of 1/16"-3/8" capacity, an adapter 34 is employed. This adapter may conveniently have an outside diameter equal to that of the feed tube 35 and it is preferably formed as a cylindrical tube, being interiorly threaded at its forward end to receive the threaded portion 14 of the pusher and having at its rear end an exteriorly threaded portion for connection to the forward end of the feed tube.

Adapter 34, like adapter 16 of Figure 1, is intended to selectively receive feed pushers for stock within a limited range of diameters, namely 1/16" to 3/8". In Figure 5, a feed pusher 36 for stock of 1/16" is shown connected to adapter 34. This feed pusher is the same in all dimensions as pusher 10, except for the size of the bore, and it can, therefore, be used with adapter 16 in a machine of 1/16"-7/8" capacity with the same efficiency as in a machine of 1/16"-3/8" capacity, when combined with adapter 34.

Feed pushers 10 and 36, together with other feed pushers for stock within the range of 1/16" to 3/8", may be used in a machine of 1/16"–5/8" capacity, shown in Figure 6, by employing a suitable adapter 37. This adapter, although being somewhat smaller, is of substantially the same shape and has the same structural features as adapter 22 shown in Figure 2 and it is connected to the feed tube 38 of the machine in the same manner as other adapters are connected to their respective machines.

Feed pusher 23 for feeding 5/8" stock and shown in Figure 2 associated with a machine of 1/16"–7/8" capacity may, like all other pushers constructed in accordance with the present invention, be used in any machine capable of receiving 5/8" stock by providing a suitable adapter. In Figure 7, pusher 23 is shown associated with a machine of 1/16"–5/8" capacity by employing an adapter 39. This adapter, while being smaller than adapter 24 and larger than adapter 34, has the same structural features as those members. The interiorly threaded portion at the forward end of the adapter is the same size and is formed with the same character of threads as adapter 22 of Figure 2, so that like that adapter it can receive each of the feed pushers for stock within the limited diameter range of 25/64" to 5/8", inclusive.

It should be noted that feed pusher 23 is longer than feed pusher 10, but adapter 39, which receives pusher 23, is shorter than adapter 37, which receives pusher 10, by an amount equal to the difference in length of the two pushers. The combined length of each adapter and its associated pusher is, therefore, the same and thus, no matter what size stock is fed in the machine, there will be no wastage of bar ends.

From the foregoing, it will be perceived that the present invention eliminates the necessity of making all spring finger feed pushers for a particular machine of the same length. The invention enables the use of feed pushers which, regardless of the capacity of the machine with which they are to be associated, are designed with particular reference to the specific diameter and weight of stock they are to respectively feed. Most efficient performance of the feed pushers is thus assured and, moreover, since the pushers are designed without regard to the capacity of the machine, each may be used in any machine capable of receiving the stock for which the pusher is designed. This enables the feed pushers to be interchangeably used in machines of different capacities and, therefore, greatly simplifies the stock of feed pushers the screw manufacturer must keep on hand. Furthermore, as most spring finger feed pushers heretofore used are considerably larger than necessary, properly designed feed pushers made from the same kind of metal will be less expensive, or superior grade spring steel can be used without increased cost.

What we claim is:

1. Stock feeding mechanism for automatic screw machines having reciprocating feed tubes, said mechanism including a spring finger feed pusher adapted for interchangeable use in screw machines of different capacities, and a member for connecting the feed pusher in predetermined spaced relation to the forward end of the feed tube of a screw machine of one capacity, said feed pusher being adapted to interchangeably receive a plurality of said members each of different size whereby the pusher may be selectively connected to the feed tubes of machines of different capacities.

2. Stock feeding mechanism for an automatic screw machine, said mechanism comprising a reciprocating feed tube, an adapter connected to said tube and forming an extension thereof, and a spring finger feed pusher connected to said adapter, said tube being adapted to interchangeably receive adapter members of respectively different lengths provided at their outer ends with threaded portions of different diameters, and said adapter being adapted to interchangeably receive individual spring finger feed pushers of respectively different internal diameters.

3. Stock feeding mechanism for interchangeably associating a spring finger feed pusher with automatic screw machines of different maximum capacities respectively provided with reciprocating feed tubes each adapted to be selectively provided with a plurality of feed fingers for feeding stock of different diameters, said mechanism including a spring finger feed pusher adapted to be interchangeably associated with said different capacity machines, and a member for connecting the feed pusher to the forward end of the feed tube of the machine of greatest capacity, said member being adapted to position the outer end of the pusher in advance of the outer end of said tube a distance substantially equal to the amount the outer end of other feed pushers of said machine are adapted to be positioned in advance of the tube when associated therewith.

4. Stock feeding mechanism for an automatic screw machine having a reciprocating feed tube adapted to interchangeably receive a plurality of spring finger feed pushers for feeding stock of different diameters within a given range, said mechanism including a spring finger feed pusher for feeding stock of a diameter less than the maximum of said range, said pusher being of less length and external diameter than the pusher for feeding stock of the maximum diameter of said range whereby it is adapted for use in automatic screw machines limited to feeding stock of less diameter than said maximum, and a member for connecting the feed pusher in spaced relation to the forward end of the feed tube, said member being of such length as to position the outer end of the said spring finger feed pusher in advance of the forward end of the tube a distance substantially equal to the amount the outer end of the feed pusher for feeding stock of said maximum diameter is positioned in advance of the tube when it is associated therewith.

5. Stock feeding mechanism for an automatic screw machine having a reciprocating feed tube, said mechanism including a spring finger feed pusher for feeding stock of a given diameter, said feed pusher being of a size capable of use in an automatic screw machine for receiving stock of different diameters within a range including said given diameter, and a member for connecting said feed pusher to the feed tube of an automatic screw machine capable of receiving stock of greater diameter than the maximum of said range, said member having at one end a portion of one diameter for connection to the feed pusher and having at its opposite end a portion of larger diameter for connection to the feed tube.

6. Stock feeding mechanism for an automatic screw machine adapted to receive stock of different diameters within a given range and having a hollow spindle and a feed tube reciprocable therein, said mechanism comprising a spring finger feed pusher for feeding stock of a diameter less than the maximum of said range, and a member for connecting the feed pusher to said feed tube, said member being provided at one end with a portion of one diameter for connection to said feed pusher and having at its opposite end a portion of larger diameter for connection to the feed tube, and the feed pusher being of less external diameter than the internal diameter of said spindle, whereby the pusher is capable of use in automatic screw machines limited to feeding stock of diameters less than the maximum of said range but including said given diameter.

7. Stock feeding mechanism for an automatic screw machine having a reciprocating feed tube, said mechanism including a spring finger feed pusher for feeding stock of a given diameter, said feed pusher being of a size capable of use in an automatic screw machine limited to receive stock of a diameter not substantially greater than said given diameter, and a member for connecting the feed pusher to a feed tube of an automatic screw machine capable of receiving stock of a diameter substantially greater than said given diameter, said member having at one end a screw threaded portion of one diameter for connection to the feed pusher and having at its opposite end a screw threaded portion of larger diameter for connection to the feed tube.

8. In an automatic screw machine for receiving stock of different diameters within a given range, the combination with a reciprocating feed tube, of a spring finger feed pusher for feeding stock of a diameter less than the maximum of said range, said pusher being of a size capable of use in an automatic screw machine limited to feeding stock of less diameter than said maximum, and a member for connecting the feed pusher in spaced relation to the outer end of the feed tube, said member having screw threaded connection with both the feed tube and the feed pusher and being provided at its opposite ends with stop shoulders respectively cooperable with the tube and pusher for determining the spacing of the outer end of the pusher in advance of the outer end of the tube.

CARL W. BETTCHER.
THOMAS F. COX.